United States Patent
Lilly et al.

[15] 3,674,767
[45] July 4, 1972

[54] NOVEL POLYMERIC MATERIALS CONTAINING TRIAZINYL GROUPS

[72] Inventors: Malcolm Douglas Lilly; Garth Kay; Richard John Hugh Wilson; Allister Kimball Sharp, all of London, England

[73] Assignee: National Research Development Corporation, London, England

[22] Filed: July 5, 1968

[21] Appl. No.: 742,612

[30] Foreign Application Priority Data

July 14, 1967 Great Britain.....................32,541/67
Feb. 12, 1968 Great Britain.......................6,869/68
April 10, 1968 Great Britain.....................17,322/68

[52] U.S. Cl..................260/89.1, 260/91.3 VA, 260/112 R, 260/209 D, 260/213, 260/233.3 R, 195/63, 195/DIG. 11
[51] Int. Cl........................................................C08f 27/08
[58] Field of Search..................260/91.3 VA, 233.3 R, 89.1, 260/209 D, 112 R, 213

[56] References Cited

UNITED STATES PATENTS

| | | | |
|---|---|---|---|
| 2,623,041 | 12/1952 | Gassie | 260/231 |
| 2,623,042 | 12/1952 | Vaughan | 260/231 |
| 3,000,762 | 9/1961 | Tesopo | 117/139.5 |
| 3,033,842 | 5/1962 | Holtschmidt | 260/91.3 |
| 3,317,346 | 5/1967 | Kibbel et al | 127/70 |
| 3,557,073 | 1/1971 | Kay | 260/91.3 |

*Primary Examiner*—Joseph E. Schofer
*Assistant Examiner*—Stanford M. Levin
*Attorney*—Finnegan, Henderson & Farabow

[57] ABSTRACT

A polymer that is substituted by pendant triazinyl groups of the formula:

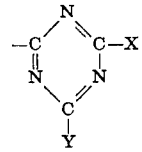

where X represents a radical capable of reacting with a biologically active substance, and Y represents a halogen atom, or a nucleophilic group that is an amino group, or an aliphatic or aromatic group, and also by a further substituent group which has a positive charge when the polymer is in contact with a solution having a pH in the normal biological range.

18 Claims, 1 Drawing Figure

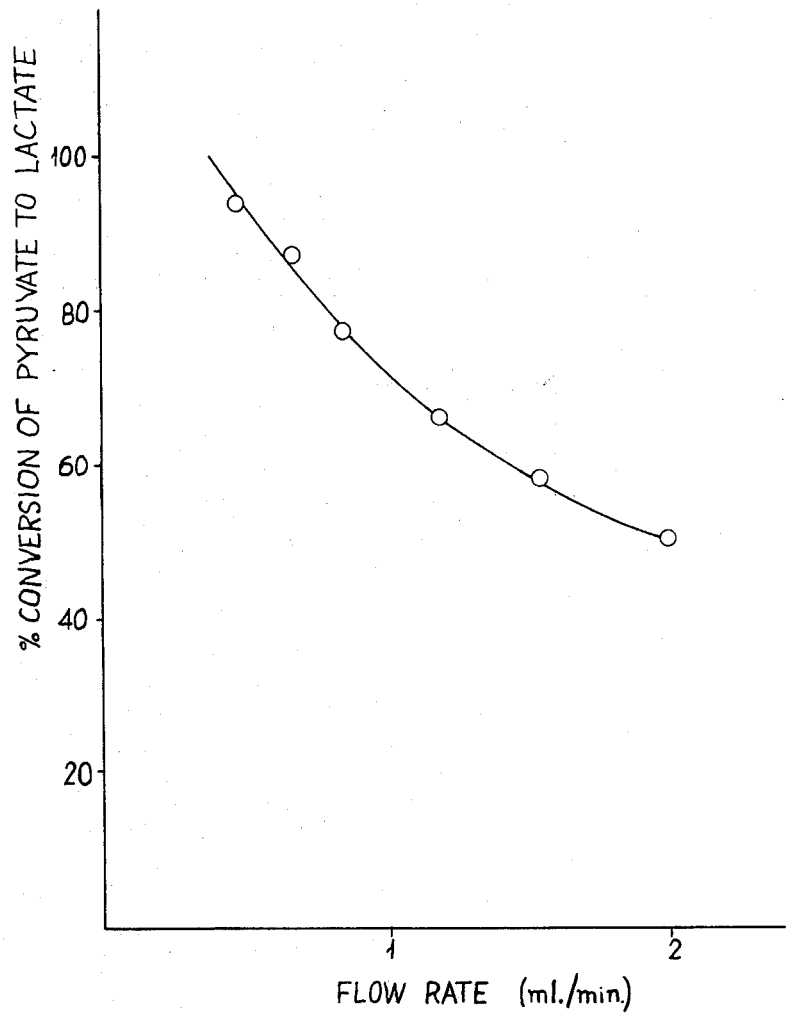

NOVEL POLYMERIC MATERIALS CONTAINING TRIAZINYL GROUPS

This invention relates to polymers and in particular to a novel polymer which is capable of acting as a support for a biologically active substance.

The utility of enzymes as catalysts and other biologically active substances such as, for example, antigens and antibodies in purifications, can be increased by attaching them to solid supports so that, for example, they can be removed from the reaction mixture or used in processes in which the reactants flow continuously over them. Also, the stability of an enzyme attached to a solid support is often greater than that of the free enzyme. It has been proposed to bind enzymes to polymers by means of bridging groups, but it has been found in some instances that the catalystic properties of the enzyme are greatly reduced.

We have now discovered a novel polymer having improved properties in this respect.

The invention comprises a polymer that is substituted by pendant triazinyl groups of the formula:

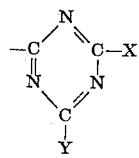

where X represents a radical capable of reacting with a biologically active substance, for example, a halogen atom, and Y represents a halogen atom, or a nucleophilic substituent that is an amino group, or an aliphatic or aromatic group, and also by a further substituent group which has a positive charge when the polymer is in contact with a solution having a pH in the normal biological range.

Also included within the invention is a process for the production of a polymer which comprises reacting a polymer which is substituted by a group which has a positive charge when the polymer is in contact with a solution having a pH in the normal biological range, with a triazine of formula:

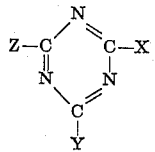

where X and Y are as previously defined and Z is a halogen atom, and stopping the reaction before substantial cross-linking has occurred.

THe invention also includes a process for the production of a polymeric material having a biologically active substance bound thereto which comprises reacting the above-mentioned polymer with a biologically active substance, and a polymeric material produced by such a process.

A pH within the normal biological range is one at which biological reactions will proceed, and is usually between 2 and 10 particularly between 5 and 9, such as, for example 7. Groups which have a positive charge at pH values within the normal biological range include particularly substituted or unsubstituted amino groups such as, for example:

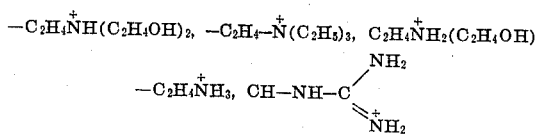

The group Y can also be one that carries a positive charge when in contact with solutions having a pH in the normal biological range. The presence of such a positive charge frequently assists the reaction of biologically active substance with the polymer.

Where Y is a nucleophilic aliphatic or aromatic groups, this is preferably one which contains nitrogen, oxygen or sulphur, and particularly a nitrogen-containing group such as, for example, a substituted amino group.

As examples of preferred nucleophilic groups, there may be mentioned amino, alkyl or aryl amino (—NHR), alkyloxy, aryloxy, alkylthio, and arylthio groups, and residues of dyestuffs, particularly those containing amino groups such as, for example, nitro-dyestuffs, azo-dyestuffs, including thiazole dyestuffs, pyrazolone or hydrazone dyestuffs, di- and tri-aryl methane dyestuffs, acridine-, oxyazine-, thiazine- and azine dyestuffs, indigoids, aminoanthraquinones, aromatic diamines, aminophenols, aminonaphthols and N and O-acidyl or alkyl, aralkyl or aryl derivatives of these, nitramines, thiophenols, or amino mercaptans.

Particular examples of suitable nucleophilic groups include —O·CH$_2$·COOH, —NH·CH$_2$·COOH, —S·CH$_2$COOH, —NH·C$_2$H$_4$·SO$_3$H, —OC$_4$H$_8$·N$^+$(C$_2$H$_5$)$_3$, —NH·C$_6$H$_4$·SO$_3$H, —O·C$_6$H$_4$·COOH, —S·C$_6$H$_4$·COOH, —NH·C$_6$H$_4$·OH and —O·C$_2$H$_4$·OH. Excellent results have been obtained using —NHC$_3$H$_6$·N$^+$H(C$_2$₄OH)$_2$ as the nucleophilic group.

Where X represents a halogen atom this is preferably a chlorine or fluorine atom. Z is also preferably a chlorine or fluorine atom.

The polymer, in addition to the positively-charged substituent groups, preferably also carries free hydroxyl groups, and it can, for example, be derived from a naturally occurring polymer such as a cellulose, a crosslinked dextrans sold under the trademark Sephadex by Pharmacia of Uppsala, Sweden, starch, dextran, or proteins such as wool, or a synthetic polymer such as polyvinyl alcohol or partially hydrolized polyvinyl acetate. Excellent results have been obtained using a cellulose on which are substituted diethylaminoethyl groups. The polymer is preferably used in the form of a sheet, for example, as described in our co-pending application Ser. No. 742,901.

Positively-charged groups can be introduced into a polymer containing free hydroxyl groups by a variety of methods, for example, those described in U.S. Pat. Nos. 2,623,042, 2,623,041 and in Kolloid Z. *41*, 152 (1927) by P. Waentig, and J.A.C.S. *78* (1956) 751.

The reaction of the polymer with the triazine can be carried out in aqueous solution if the triazine and the polymer are soluble in water, and the reaction can be stopped by reducing the pH, for example, by washing with sodium chloride solution. The solubility of the triazine depends on the group Y, and, for example, where Y is a solubilizing substituent such as —O·CH$_2$·COOH, —NH·CH$_2$·COOH, —S·CH$_2$·COOH, —NH·C$_2$H$_4$·SO$_3$H, —OC$_4$H$_8$·N$^+$(C$_2$H$_5$)$_3$, —NH·C$_6$H$_4$·SO$_3$H, —O·C$_6$H$_4$·COOH, —NH·C$_2$H$_4$·OH or —O·C$_2$H$_4$·OH or the residue of dyestuffs containing amino groups such as nitro-dyestuffs and azo-dyestuffs, the reaction can be carried out in aqueous solution. If the triazine is not water-soluble a mixed organic/aqueous solvent can be used. The triazine will not be water-soluble when Y in the formula represents, for example, methoxy, ethylamino, butylthiol, or phenoxy.

When the polymer contains positively-charged substituent groups that are primary amino groups the triazine used is preferably cyanuric chloride, although care should be taken to remove any traces of unreacted cyanuric chloride before reacting the polymer with the enzyme. This can be conveniently done by adding a reagent such as N-(3 aminopropyl) diethanolamine.

A wide range of biologically active substances can be bound to the polymers of the present invention including enzymes present in or isolated from animal, plant or microbiological tissue such as, for example, proteolytic enzyme such as trypsin, chymotrypsin and papain; hydrolases such as β-galactosidase, ribonuclease, alkaline phosphatase, amyloglucosidase and dextranase; dehydrogenases such as lactic dehydrogenase; kinases such as creatine phosphokinase, and pyruvate kinase; oxidases such as glucose oxidase; and amidases such as amidase and penicillin amidase; antigens and antibodies. Reaction between the biologically active substance and the polymer occurs by replacement of the halogen atom represented by X in the formula, by the residue of the biologically active substance. Since biologically active substances are usually unstable, the temperature should be low, for example, about room temperature, and the pH as near to neutral as possible. However, in some instances it may be necessary to use a slightly alkaline pH, for example, a pH between 7 and 8.6, as the reaction occurs more rapidly at alkaline pH. At neutral pH it may not be sufficiently rapid for practical purposes. The reactants are left in contact until reaction has occurred. When Y represents a halogen atom the reaction may be complete in a matter of minutes, but when Y represents any of the groups given above the reaction is slower and may take several hours.

When the reaction with the biologically active substance has been completed, any unreacted halogen atoms are preferably deactivated, for example, by reaction with ammonia or the aliphatic amine.

The polymeric materials of the invention having a biologically active substance bound thereto can be used in a wide variety of enzymatically catalysed reactions, and are often suitable for use in processes in which soluble enzymes have previously been used. Thus they may, for example, be used in the preparation of penicillins, beer clarification, the preparation of glucose using amyloglucosidase, and preparation of optically active amino acids, and the formation of 1-alanine by transamination. Other potential uses include acid hydrolysis of carbohydrates, the processing of waste materials, the specific manipulation of large natural molecules such as steroids, alkaloids, chloramphenicol and riboflavine, alcoholic and other kinds of fermentation, the fixing of nitrogen, a luciferase system for ATP estimation, biochemical fuel-cells, and the specific oxidation and reduction or organic materials, including carbon dioxide fixation.

The insolubilized enzymes may also be used in enzymatic analysis, particularly in the sequential analysis of proteins, RNA, and DNA. In this case the substrate can be, for example, forced through a permeable sheet containing the enzyme by means of a syringe. Where chromatography follows the reaction, it may be possible to chromatograph the substrate across a permeable sheet containing the enzyme, for example in urea analysis.

The invention is illustrated by the following Examples:

EXAMPLE 1

This Example describes the preparation of chloro-carboxy methylamine-s-triazinyl diethylaminoethyl cellulose and the reaction of this polymer with the enzyme β-galactosidase.

0.1 gram of 2,4-dichloro-6-carboxymethylamino-s-triazine is added to 5 milliliters of distilled water and the pH of the solution adjusted to 7 with N/1 NaOH. The s-triazine dissolves during this process.

The volume of the solution is made up to 20 milliliters with distilled water. 0.4 gram of anhydrous sodium carbonate is added to the solution and dissolved rapidly. Within less than 1 minute, 6 discs of DE81 paper (a paper manufactured by Whatman (Reeve-Angel & Co.) consisting predominantly of cellulose on which are substituted diethylamino ethyl groups) are added and the mixture is gently shaken (the discs are 2.5 centimeters in diameter) at 20°–25° C. After 3 minutes the volume of the solution is increased to 50 milliliters and N/1 HCl added to bring the pH down to about 2. The discs are then washed with a mixture of dilute N/50 HCl and ethanol, and finally with N/1 NaCl solution and distilled water. 0.005 gram of the enzyme (β-galactosidase) in 0.5 milliliter of 0.1M phosphate buffer pH8 is placed on each disc, and the mixture kept at 25° C for 2 hours. Each disc is then washed with 2N urea/1N NaCl mixture until no enzymatic activity is detectable in the washings.

The weight of each disc is about 0.04 gram. About 5 percent by weight of enzyme is attached. It maintains about 25 percent of its free solution activity.

EXAMPLE 2

This Example describes the coupling of penicillin amidase with chloro-carboxymethylamino-s-triazinyl diethylaminoethyl cellulose and its reaction with benzylpenicillin.

Penicillin amidase is isolated from *Escherichia coli* ATCC 9637 by mechanical disruption of the cells, treatment with streptomycin, ammonium sulphate and polyethylene glycol fractionations and chromatography on diethylaminoethyl cellulose. The enzyme is purified up to 200-fold.

The chloro-carboxymethylamino-s-triazinyl derivative of diethylaminoethyl cellulose (Whatman DE52 paper) is prepared as described in Example 1.

Penicillin amidase (25 mg) in 9 ml of 0.01M-phosphate buffer pH 8.0 is added to the damp cellulose derivative (about 2.5 gm dry weight) and the volume made up to 20 ml with water. The pH is adjusted to 8.7 and kept at that pH by titration until no further evolution of acid occurs (about 30 – 60 minutes). The mixture is then incubated overnight at 37° C, and then washed with 0.05M phosphate buffer, pH 7.2 containing 2M sodium chloride. No enzyme activity is found in the washings. The insoluble enzyme is suspended in 1N N(3-aminopropyl)-diethanolamine containing 0.9N HCl, packed in a column, and left overnight at 37° C. The column is washed with 0.5M — phosphate buffer, pH 7.2, containing 2M sodium chloride. No enzyme activity is present in the washings. The enzyme attached to the column retains about 20 percent of its original activity. 0.1M phosphate buffer containing benzylpenicillin is pumped through the column (2.5 cm high × 2.0 cm diameter) at various flow rates between 0.1 and 1.0 milliliters per minute per square centimeter of column. The temperature is 37° C. At 0.02M benzylpenicillin 100 percent conversion is achieved.

EXAMPLE 3

Lactic dehydrogenase has been chemically attached to Whatman DE81 anion-exchange chromatography paper by the following method. A strip of the paper (46 × 6 cm) was immersed in a solution (250 ml) containing 0.05 g of a Procion brilliant orange dye. After 10 minutes, 0.65 g of anhydrous sodium carbonate was added and the liquid was gently agitated for 45 minutes. The paper was washed repeatedly in 1M-sodium chloride until almost all the unreacted dye had been removed. The paper was rinsed six times in water and freeze-dried.

A 3 mM-phosphate buffer, (pH 7.4) (0.42 ml) containing lactic dehydrogenase (10 mg/ml) was added to 5 ml of 0.1 M-sodium borate buffer, (pH 8.75) and this mixture was poured over eight discs (2.5 cm diameter) of the dyed DE81 paper and left for 28 hours at room temperature. The paper discs were washed three times with 1M-sodium chloride (5 ml) for 10 minutes. After further washing in a solution of 1M-ammonium chloride in 0.1M-sodium hydroxide, (pH 8.6) the discs were stored overnight in this solution at 2° C.

Finally the discs were rinsed five times with 1M-sodium chloride (5 – 10 ml) and four times with water (10 ml). The discs were stored at 2° C.

A single disc of the enzymically-active paper was fixed in a small plastic filter and backed by a whatman No. 54 filter paper on the inlet side. The disc was perfused with 1M-sodium chloride for about 1 hour at 2.5 ml/min. to remove any free enzyme still absorbed in the sheet matrix. The disc was then perfused at 25.5° C with a solution containing 0,83 M-sodium chloride, 0.01M-potassium phosphate (pH 7.4) 0.142 mM-sodium pyruvate and 0.223 mM-NADH (reduced nicotinamide adenine dinucleotide). The percentages of the pyruvate converted to lactate for different flow rates of the solution through the disc are show in in FIG. 1.

We claim:

1. A hydroxy containing polymer that is substituted by pendant triazinyl groups of the formula:

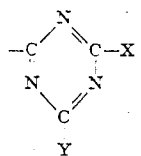

where X represents a halogen atom capable of reacting with a biologically active substance, and Y represents a halogen atom, or a nucleophilic group that is an amino group, or an aliphatic or aromatic group, and also by a further substituent group which is a substituted or unsubstituted amino group and has a positive charge when the polymer is in contact with a solution having a pH between 2 and 10.

2. A polymer according to claim 1, in which the further substituent group is one that has a positive charge when the polymer is in contact with a solution having a pH between 5 and 9.

3. A polymer according to claim 1, in which the further substituent group is

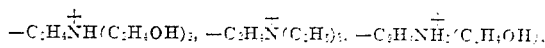
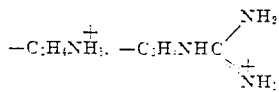

4. A polymer according to claim 1, in which the substituent group is a diethylaminoethyl group.

5. A polymer according to claim 1, in which the group Y is one that carries a positive charge when in contact with solutions having a pH between 2 and 10.

6. A polymer according to claim 5, in which the group Y is one that carries a positive charge when in contact with solutions having a pH between 5 and 9.

7. A polymer according to claim 1, in which Y is a nucleophilic group which contains nitrogen, oxygen or sulphur.

8. A polymer according to claim 1, in which Y is an amino, alkyl or aryl amino, alkyloxy, aryloxy, alkylthio, or arylthio group.

9. A polymer according to claim 1, in which Y is —O·CH$_2$·COOH, —NH·CH$_2$·COOH, —S·CH$_2$·COOH, —NH·C$_2$H$_4$·SO$_3$H, —O·C$_4$H$_8$·N$^+$, (C$_2$H$_5$)$_3$, —NH·C$_6$H$_4$·SO$_3$H, —O·C$_6$H$_4$·COOH, —S·C$_6$H$_4$COOH, —NH·C$_2$H$_4$·OH, or O·C$_2$H$_4$OH.

10. A polymer according to claim 1, in which Y is —NH·C$_3$H$_6$·N$^+$O(C$_2$H$_4$OH)$_2$.

11. A polymer according to claim 1, in which X is a chlorine or fluorine atom.

12. A process for the production of a polymer which comprises reacting at a non-acid pH a hydroxy containing polymer which is substituted by a substituted or unsubstituted amino group which has a positive charge when the polymer is in contact with a solution having a pH of 2–10 with a triazine of formula:

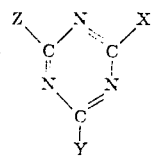

where X represents a halogen atom capable of reacting with a biologically active substance, Y represents a halogen atom, or a nucleophilic group that is an amino group, or an aliphatic or aromatic group, and Z represents a halogen atom, and after the reaction has occurred reducing to an acid pH.

13. A process according to claim 12, in which Z is a chlorine or fluorine atom.

14. A process according to claim 12 in which the hydroxy containing polymer that is substituted by a group which has a positive charge is prepared by introducing a group which has a positive charge into a cellulose, a cross linked dextran, starch, dextran, wool, polyvinyl alcohol, or partially hydrolyzed polyvinyl acetate.

15. A process according to claims 12, which is carried out in aqueous solution.

16. A process according to claims 12 which is carried out in a mixed organic/aqueous solvent.

17. A process according to claims 12, in which the triazine is cyanuric chloride.

18. A process according to claim 17, in which unreacted cyanuric chloride is deactivated by adding N-(3 aminopropyl) diethanolamine.

* * * * *